United States Patent [19]

Ida et al.

[11] Patent Number: 4,515,691
[45] Date of Patent: May 7, 1985

[54] FILTRATION APPARATUS

[75] Inventors: Hiroaki Ida, Uji; Masahiro Fujii, Kyoto; Toshio Haruta, Nagaokakyo, all of Japan

[73] Assignee: Unitika, Ltd., Hyogo, Japan

[21] Appl. No.: 392,361

[22] Filed: Jun. 25, 1982

[30] Foreign Application Priority Data

Jul. 13, 1981 [JP] Japan .................. 56-109838

[51] Int. Cl.³ ........................... B01D 29/08
[52] U.S. Cl. ..................... 210/274; 210/279; 210/500.1
[58] Field of Search ............. 210/274, 279, 505, 275, 210/795, 791, 508, 500.1

[56] References Cited

U.S. PATENT DOCUMENTS

| | | | |
|---|---|---|---|
| 553,641 | 1/1896 | Deutsch | 210/274 |
| 956,832 | 5/1910 | Seitz | 210/500.1 |
| 4,076,625 | 2/1978 | Scholten et al. | 210/274 |
| 4,186,101 | 1/1980 | Reinhart | 210/508 |
| 4,197,205 | 4/1980 | Hirs | 210/275 |

FOREIGN PATENT DOCUMENTS

| | | | |
|---|---|---|---|
| 2448508 | 10/1980 | France | 210/275 |
| 0152709 | 11/1981 | Japan | 210/508 |

Primary Examiner—John Adee
Attorney, Agent, or Firm—Barnes, Kisselle, Raisch, Choate, Whittemore & Hulbert

[57] ABSTRACT

A filtration apparatus comprising a filter tank, a support provided at least at a lower interior portion of the filter tank, a filter medium layer composed of fiber lumps accumulated on the support, a filter medium spreading zone provided within the filter tank above the support, air injecting means disposed under the filter medium layer, prefilt inlet means disposed at an upper portion of the tank, and filtrate outlet means disposed at a lower portion of the tank. The apparatus is simple in construction and easy to operate, assures depth-type filtration with high accuracy and is easy to wash for the reuse of the filter medium.

13 Claims, 3 Drawing Figures

FILTRATION APPARATUS

The present invention relates to a clarifying filtration apparatus for removing suspended fine particles from water with fiber lumps useful as a water-treating medium, the apparatus being highly efficient and easily washable.

Filter media made of fibers and heretofore used for removing suspended solids from water include sheet-like shaped media such as nets, knitted or woven fabrics and like filter fabrics, tubes prepared from such sheets, and spongy layers of short fibers joined together by melting or with a binder. Of these filter media, the filter fabric and the tubular medium provide a filtering layer of too small a thickness, so that the suspended solids are arrested chiefly at the surface of the layer. The surface filtration thus effected predominantly is not suited to clarification for treating large quantities of dilute suspensions containing fine particles. On the other hand, the mode of filtration carried out by the conventional spongy fiber layer is predominantly depth-type filtration in which the suspended solids are arrested in the interior of the layer. The spongy layer is therefore suited to clarifying filtration, but since the fibers are interconnected to provide fixed pores, it is difficult to remove the arrested solids by the usual washing method and accordingly to reuse the medium.

To overcome the above drawbacks of the known filter media, we have already proposed in Japanese Published Unexamined Patent Application No. 56-152709 a filtration apparatus comprising a filter medium in the form of a layer of short fibers which are not joined together as by melting or with a binder. With the proposed apparatus, however, suspended particles of some kind are likely to combine with short fibers to form a muddy mixture and will not readily float and flow away when air is injected into the apparatus for cleaning the filter medium, while some of the short fibers are likely to flow away as entrained in the washings.

The object of the invention is to provide a filter apparatus which comprises such a layer of short fibers as its filter medium and which is free of the above drawbacks while retaining the advantage inherent in the apparatus of this type.

To fulfill the above object, the present invention provides a filtration apparatus comprising a filter tank, a support provided at least at a lower interior portion of the filter tank, a filter medium layer formed on the support and composed of accumulated lumps of interlocked short fibers 5 to 50 mm in fiber length, a filter medium moving zone provided within the filter tank above the support for rendering the fiber lumps free to move therein during washing of the filter medium, air injecting means disposed under the filter medium layer, prefilt inlet means disposed at one of an upper portion and a lower portion of the filter tank, and filtrate outlet means disposed at the other of the filter tank upper portion and lower portion.

The fiber lumps useful as filter media for the filtration apparatus of the invention are those of organic fibers including natural fibers, regenerated fibers, synthetic fibers, etc., and inorganic fibers including glass fibers, metal fibers, mineral fibers, etc. Useful fibers are 5 to 50 mm in length and 10 to 100 microns in thickness. The fiber lumps can be prepared by dispersing such suitable fibers in water and injecting a gas into the water or mechanically stirring the water to agitate the fibers with the flow of water and shaking and thereby interlock the fibers into lumps. Fibers shorter than 5 mm, if used, are difficult to form into lumps, whereas those longer than 50 mm will be firmly interlocked and entangled inseparably into lumps which are more than 20 cm in length like/chains and unfit for use as a filter medium. Preferably the fiber lumps are globular or ellipsoidal and 5 to 100 mm in maximum diameter.

The thickness of the filter medium layer, which can be determined as desired, is preferably at least 30 cm in view of the filtering efficiency and reformation of the filter layer with the fiber lumps after washing.

Generally the height of the filter medium moving zone formed above the filter medium layer may be determined suitably as desired. However, it is required that the height be at least one half the thickness of the filter medium layer to assure a space sufficient for the individual fiber lumps to move freely during washing of the filter medium.

The support for the filter medium layer composed of a multiplicity of fiber lumps in accumulation may comprise a strainer or the like and a gravel layer placed thereon or may consist singly of a perforated plate. In the former case, the strainer chiefly functions to support the gravel layer and pass the filtrate uniformly therethrough, so that the strainer, unlike usual strainers, need not arrest the suspended solids (which can be fully arrested by the filter medium layer). The gravel forming the gravel layer must be so sized as not to permit the passage of the fiber lumps along with the liquid. Thus the size of the gravel is determined suitably within the range of 3 to 50 mm usually. The gravel layer needs to have a thickness of 5 to 30 cm. The strainer must of course have a slit width or opening diameter which is smaller than the size of the gravel but permits passage of the suspended solids released from the fiber lumps during the washing of the filter medium. In the case of the perforated plate serving singly as the support, the perforations thereof preferably have such a diameter that will not permit the fiber lumps to pass through the plate and flow away with the liquid, whereas it is required that the plate do not give great resistance to the flow of liquid and facilitate passage of suspended solids during the washing of the filter medium. Usually the perforation diameter is suitably determined within the range of 2 to 10 mm.

The air injecting means disposed under the filter medium layer comprises an air injecting pipe provided under the support. Alternatively, when the support is composed of a gravel layer and a strainer, the air injecting means may comprise a first air injecting pipe interposed between the filter medium layer and the gravel layer, and a second air injecting pipe connected to the lower end of the filter tank and capable of injecting air into the tank in an explosive fashion.

Various other features and advantages of the present invention will be readily understood from the embodiments to be described below with reference to the accompanying drawings, in which.

Figure 1:
FIG. 1 is a view showing a fiber lump useful for the filtration apparatus of the invention.

One of the features of the invention is that a multiplicity of fiber lumps, such as the one shown in FIG. 1, are accumulated to form a filter medium layer which is suited to depth-type filtration. The fiber lump may have a globular shape as illustrated or may be ellipsoidal or in the form of a disk. As already stated, fiber lumps of this kind can be formed by dispersing short fibers, 5 to 50 mm in length and 10 to 100 microns in thickness, in water and injecting a gas into the water or mechanically stirring the water to agitatet the fibers by the flow of water and shaking and thereby interlock the fibers into lumps.

Figure 2:
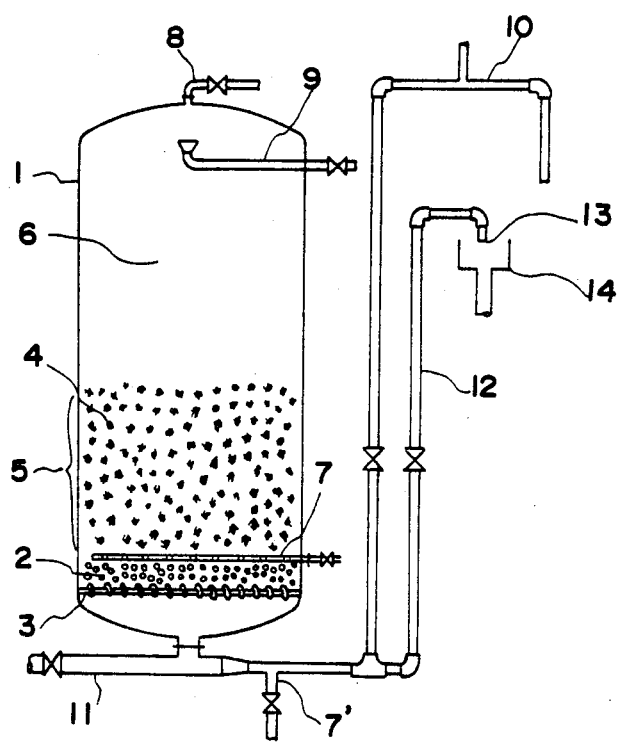
FIG. 2 is a diagram in vertical section showing a first embodiment of the invention.

FIG. 2 shows a filtration apparatus embodying the invention and having incorporated therein a filter medium layer composed of such fiber lumps in accumulation. A filter tank 1 having a suitable diameter is provided in a lower interior portion thereof with a support comprising a gravel layer 2 and a strainer 3. A multiplicity of fiber lumps 4 are accumulated on the gravel layer 2 to form a filter medium layer 5. A filter medium moving zone 6 is formed above the layer 5 to provide a space in which the fiber lumps 4 are caused to move for washing the filter medium. A first air injecting pipe 7 having a stop valve is interposed between the gravel layer 2 and the filter medium layer 5. A second air injecting pipe 7' having a stop valve is connected to the lower end of the filter tank 1. An air vent pipe 8 having a stop valve is connected to the upper end of the tank 1. A prefilt inlet pipe 9 having a stop valve extends into an upper interior portion of the tank 1. Further connected to the lower end of the tank 1 are a filtrate outlet pipe 10, a wash discharge pipe 11 and a drain pipe 12 for drawing off a portion of liquid, each of these pipes being provided with a stop valve. The drain pipe 12 connected to the lower end of the tank 1 extends upward alongside the tank 1 and has an opening 13 which is positioned 20 to 50 cm below the upper end of the filter tank 1. The filtrate outlet pipe 10 extends upward approximately to the same level as the upper end of the tank 1. Indicated at 14 is a drain container for discharging from the system the portion of liquid drawn off.

Figure 3:
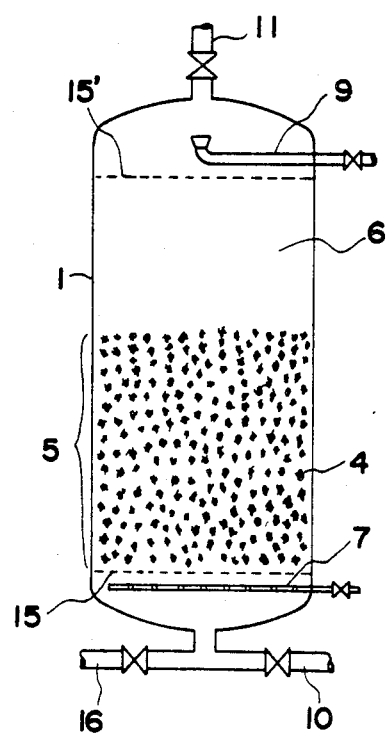
FIG. 3 is a diagram in vertical section showing a second embodiment of the invention.

FIG. 3 shows another embodiment of the invention. Perforated plates 15, 15' are provided at upper and lower portions of a filter tank 1. A filter medium layer 5 composed of an accumulation of fiber lumps 4 and a filter medium moving zone 6 are provided between the perforated plates, 15, 15'. An air injecting pipe 7 having a stop valve is disposed under the lower perforated plate 15. A wash discharge pipe 11 having a stop valve is connected to the upper end of the filter tank 1. A prefilt inlet pipe 9 having a stop valve extends into an upper interior portion of the tank 1 above the upper perforated plate 15'. A filtrate outlet pipe 10 and a wash liquid supply pipe 16, each having a stop valve, are connected to the lower end of the tank 1.

The filtration apparatus shown in FIG. 2 is used in the following manner for filtration. The stop valves on the first and second air injecting pipes 7, 7', the wash discharge pipe 11 and the drain pipe 12 are closed, while the stop valves on the prefilt inlet pipe 9 and the filtrate outlet pipe 10 are opened. A prefilt is supplied, for example, by a feed pump (not shown) to the filter tank 1 via the inlet pipe 9 to fill the tank 1, and the air vent pipe 8 is thereafter closed. The feed pressure of the prefilt compresses the filter medium layer 5 on the gravel layer 2, reducing the interstices between the fiber lumps 4 of the medium and causing the medium to arrest the suspended solids in the prefilt by depth-type filtration. The filtrate is run off through the filtrate outlet pipe 10. The filtration can be promoted by suitable means, for example, by applying a suitable negative pressure to the outlet of the apparatus with a pump having its suction side connected to the filtrate outlet pipe 10.

When the apparatus starts to exhibit a reduced filtering efficiency due to the clogging of the filter medium layer 5 with the arrested solid particles after operating a period of time, the operation is interrupted to wash the medium.

The feed of the prefilt is discontinued first for this procedure to relieve the filter medium layer 5 of the pressure, permitting the constituent fiber lumps 4 to elastically restore themselves to a bulky state and increasing the interstices between the fiber lumps 4 to render the medium easy to wash. The stop valves on the first and second air injecting pipes 7, 7', the prefilt inlet pipe 9, the filtrate outlet pipe 10 and the wash discharge pipe 11 are closed, while the air vent pipe 8 and the drain pipe are opened at their stop valves to partly drain the filter tank 1 through the drain pipe 12 and lower the water level therein to the same level as the opening 13 of the pipe 13. Subsequently cleaning air is injected into the tank 1 explosively over the entire interior area thereof through the second air injecting pipe 7' connected to the lower end of the tank 1 to shake the fiber lumps 4 in the liquid and release the arrested solid particles therefrom. With continued injection of air, the fiber lumps 4 of the layer 5 spread into the moving zone 6, thus moving upward while spreading, and further move upward and downward, whereby the arrested solid particles are separated and removed from the medium.

After the lapse of a period of time, the stop valve on the second air injecting pipe 7' is closed, and the stop valves on the first air injecting pipe 7 on the upper side of the gravel layer 2 and the wash discharge pipe 11 are opened, whereby the solid particles removed by washing are passed through the gravel layer 2 and the strainer 3 and drawn off via the pipe 11 while holding the fiber lumps 4 in suspension with the injected air.

Subsequently the stop valves on the first air injecting pipe 7, the drain pipe 12 and the wash discharge pipe 11 are closed, while the stop valves on the prefilt inlet pipe 9 and the filtrate outlet pipe 10 are opened to fill the tank 1 with prefilt. The air vent pipe 8 is thereafter closed by its valve to cause the fiber lumps 4 to accumulate on the gravel layer 2 again and form the layer 5, whereby the prefilt is filtered again.

In the above washing procedure, the prefilt can be fed at a low rate simultaneously with the injection of air while drawing off the washings at a low rate through the drain pipe 12.

The apparatus of FIG. 3 is used for filtration in the following manner. First, the stop valves on the air injecting pipe 7, the wash discharge pipe 11 and the wash liquid supply pipe 16 are closed, while the stop valves on the prefilt inlet pipe 9 and the filtrate outlet pipe 10 are opened. The prefilt supplied fills up the filter tank 1, has its suspended solids arrested by the filter medium layer 5 pressed against the lower perforated plate 15 by the feed pressure while passing through the layer, and is run off from the system via the outlet pipe 10 as a filtrate.

To wash the filter medium, the stop valves on the prefilt inlet pipe 9 and the filtrate outlet pipe 10 are closed, while the air injecting pipe 7, the wash discharge pipe 11 and the wash liquid supply pipe 16 are opened by their stop valves to supply compressed air while, at the same time, passing a wash liquid through the tank 1 by a feed pump (not shown) in the direction opposite to the flow of the liquid during filtration. The air forced in through the injecting pipe 7 and the wash liquid fed through the supply pipe 16 coact within the filter tank 1 to collapse the filter medium layer 5 from below and pass through the interstices between the fiber lumps 4, gradually moving the individual fiber lumps 4 into the moving zone 6 and progressively spreading them, whereby the solid particles arrested by the fiber lumps 4 are released, entrained in the air and liquid streams and drawn off from the system via the discharge pipe 11.

When the fiber lumps 4 are completely spread and the solid particles are completely discharged with the progress of washing, the stop valves on the air injecting pipe 7, the wash discharge pipe 11 and the wash liquid supply pipe 16 are closed, while the stop valves on the prefilt inlet pipe 9 and the filtrate outlet pipe 10 are opened to supply the prefilt and resume the filtration.

As a rule, the prefilt is passed through the apparatus of FIGS. 2 and 3 both downward as described above. With the apparatus shown in FIG. 3, however, the prefilt inlet pipe 9 and the filtrate outlet pipe 10 may be replaced by each other in reversed relation, whereby the apparatus is made usable as an upstream type apparatus. In this case, the fiber lumps 4 are pressed against the upper perforated plate 15′ to form a filter medium layer, with a filter medium moving zone provided under this layer.

As described above, the filter medium used in the filtration apparatus of the invention is composed of lumps of interlocked short fibers and can therefore be easily fluidized for washing by injecting air without resulting in any loss of the short fibers. Furthermore the apparatus of the invention operates at a very low filtration pressure, for example, of up to 1 kg/cm² even at a filtration speed of 50 m/hr, or up to 0.1 kg/cm² at 5 m/hr, so that it is advantageous also from the viewpoint of savings in energy (needed for the feed pump). Since the present apparatus is operable at a higher filtration speed than the conventional sand filtration system, etc., the apparatus can be installed in a smaller space. Because the fiber lumps serving as the filter medium are composed of short fibers about 10 to 100 microns in fineness, the medium achieves an exceedingly high filtration efficiency, such that the amount of suspended solids in the resulting filtrate is usually 5 mg/liter and can be as small as 2 mg/liter although varying with the kind of suspended solids in the prefilt.

The filtration apparatus of the invention is therefore suited for use in usual waste water treatments, for example, for treating the supernatant over the sediment of the activated sludge process or the effluent therefrom. The water treated by the filtration apparatus is useful for various purposes other than household use. When water from rivers, lakes or swamps, or underground water is treated by the apparatus with or without addition of a coagulant, the resulting filtrate is usable as industrial water or for household use. The apparatus is further useful for filtering the water for culturing fishes, the water of swimming pools and bathing water for reuse. Because the apparatus is operable at an increased filtration speed, the apparatus can be made compact and loaded on a truck for roving services.

Briefly, the filtration apparatus of the invention is simple in construction and easy to operate, does not involve great resistance to the flow of liquid and assures continuous filtration with high efficiency. Moreover, the filter medium is easy to wash and usable repeatedly for a prolonged period of time. Because of these outstanding advantages, the apparatus can be used for various purposes and is of great industrial significance.

What is claimed is:

1. A filtration apparatus comprising a filter tank, a support at least at a lower interior portion of the filter tank, a filter medium layer formed above the support and comprising accumulated but unconnected lumps of interlocked short fibers 5 to 50 mm in fiber length, said lumps being composed without a binder connecting the individual fibers thereof, the filter medium layer being composed without a binder interconnecting the individual lumps so that there is no binder in the spaces between the lumps, a filter medium moving zone provided within the filter tank above the support and having a height at least one half the thickness of the filter medium layer for rendering the fiber lumps free to move therein independently of each other during washing of the filter medium layer, air injecting means disposed under the filter medium layer, prefilt inlet means disposed at one of an upper portion of the filter tank and a lower portion thereof, and filtrate outlet means disposed at the other of the filter tank upper portion and lower portion.

2. A filtration apparatus as defined in claim 1 wherein the air injecting means is disposed below the support.

3. A filtration apparatus as defined in claim 1 wherein the prefilt inlet means comprises a prefilt inlet pipe extending into an upper interior portion of the filter tank and having a stop valve, and the filtrate outlet means comprises a filtrate outlet pipe connected to the lower end of the filter tank and having a stop valve.

4. A filtration apparatus as defined in claim 3 wherein a second support comprising a perforated plate is provided within the filter tank above the filter medium layer to define the moving zone by the second support and the filter medium layer, and a wash liquid supply pipe having a stop valve is connected to the lower end of the filter tank, a wash discharge pipe having a stop valve and being connected to the upper end of the filter tank.

5. A filtration apparatus as defined in claim 4 wherein the air injecting means comprises an air injecting pipe having a stop valve and disposed below the support within the filter tank.

6. A filtration apparatus as defined in claim 1 wherein the fiber lumps are globular or ellipsoidal and 5 to 100 mm in maximum diameter.

7. A filtration apparatus as defined in claim 1 wherein the filter medium layer is at least 30 cm in thickness.

8. A filtration apparatus as defined in claim 1 wherein the support comprises a strainer and a gravel layer formed on the strainer.

9. A filtration apparatus as defined in claim 8 wherein the gravel forming the gravel layer is 3 to 50 mm in size, and the strainer has a slit width or opening diameter smaller than the gravel size.

10. A filtration apparatus as defined in claim 8 wherein the gravel layer has a thickness of 5 to 30 cm.

11. A filtration apparatus as defined in claim 1 wherein the support comprises a perforated plate having perforations 2 to 10 mm in diameter.

12. A filtration apparatus comprising a filter tank, a support at least at a lower interior portion of the filter tank, a filter medium layer formed above the support and comprising accumulated but unconnected lumps of interlocked short fibers 5 to 50 mm in fiber length, the filter medium layer being composed without a binder interconnecting the individual lumps, a filter medium moving zone provided within the filter tank above the support and having a height at least one half the thickness of the filter medium layer for rendering the fiber lumps free to move therein independently of each other during washing of the filter medium layer, air injecting means disposed under the filter medium layer, prefilt inlet means disposed at one of an upper portion of the filter tank and a lower portion thereof, filtrate outlet means disposed at the other of the filter tank upper portion and lower portion, said prefilt inlet means comprising a prefilt inlet pipe extending into an upper portion of the filter tank and having a stop valve, said filtrate outlet means comprising a filtrate outlet pipe connected to the lower end of the filter tank and having a stop valve, a wash discharge pipe and a drain pipe, each having a stop valve, connected to the lower end of the filter tank, and an air vent pipe having a stop valve connected to the upper end of the filter tank, the drain pipe having an upward extension provided with an opening directed downward outside the filter tank toward a drain container and positioned below the upper end of the filter tank but above the filter medium layer.

13. A filtration apparatus as defined in claim 12 wherein the air injecting means comprises a first air injecting pipe having a stop valve and interposed between the filter medium layer and the support and a second air injecting pipe having a stop valve and connected to the lower end of the filter tank, the second air injecting pipe being adapted to explosively inject air into the filter tank for initiating spreading of the fiber lumps into the filter medium moving zone while removing solids from the lumps, and the first air injecting pipe being adapted to hold the thus spread lumps in suspension with the injected air while allowing the removed solids to be drawn off through the wash discharge pipe.

* * * * *